US008648575B2

(12) United States Patent
Cullen et al.

(10) Patent No.: US 8,648,575 B2
(45) Date of Patent: Feb. 11, 2014

(54) ELECTRICAL MACHINE SAFETY SYSTEM

(75) Inventors: John J A Cullen, Derby (GB); Geraint W Jewell, Sheffield (GB)

(73) Assignee: Rolls-Royce PLC, London (GB)

( * ) Notice: Subject to any disclaimer, the term of this patent is extended or adjusted under 35 U.S.C. 154(b) by 406 days.

(21) Appl. No.: 13/073,344

(22) Filed: Mar. 28, 2011

(65) Prior Publication Data

US 2011/0234180 A1    Sep. 29, 2011

(30) Foreign Application Priority Data

Mar. 29, 2010    (GB) .................................. 1005178.7

(51) Int. Cl.
| H02P 9/00 | (2006.01) |
| H02P 9/04 | (2006.01) |
| H02P 25/00 | (2006.01) |
| H03K 3/00 | (2006.01) |

(52) U.S. Cl.
USPC .................. 322/89; 318/400.11; 318/400.41; 310/181

(58) Field of Classification Search
USPC ............ 322/89; 310/181; 318/400.11, 400.41
See application file for complete search history.

(56) References Cited

U.S. PATENT DOCUMENTS

| 4,130,769 A | * | 12/1978 | Karube ............................. 310/46 |
| 4,211,963 A | * | 7/1980 | Muller ....................... 318/400.41 |
| 4,322,666 A | * | 3/1982 | Muller ....................... 318/400.41 |
| 4,354,218 A | * | 10/1982 | Steingroever et al. ......... 361/147 |
| 4,463,314 A | * | 7/1984 | Wilson ............................ 324/244 |
| 4,509,334 A | * | 4/1985 | Nakagome et al. .................. 62/6 |
| 4,551,658 A | * | 11/1985 | Rhee .......................... 318/400.11 |
| 4,589,953 A | * | 5/1986 | Nakagome et al. .............. 216/22 |
| 4,750,821 A | * | 6/1988 | Yamamoto et al. ............ 359/697 |
| 4,920,292 A | * | 4/1990 | Albrecht et al. .............. 310/114 |
| 5,099,162 A | * | 3/1992 | Sawada .......................... 505/166 |
| 5,117,128 A | * | 5/1992 | Albrecht et al. .............. 310/191 |
| 5,389,908 A | * | 2/1995 | Sawada .......................... 335/216 |
| 5,694,010 A | * | 12/1997 | Oomura et al. ........... 318/400.07 |
| 5,723,933 A | * | 3/1998 | Grundl et al. .................. 310/266 |
| 5,754,025 A | * | 5/1998 | Nanae et al. ................... 318/747 |
| 5,798,623 A | * | 8/1998 | El-Sadi ..................... 318/400.17 |
| 5,995,358 A | * | 11/1999 | Buisson et al. ................ 361/267 |
| 6,133,664 A | * | 10/2000 | Torok et al. .................... 310/181 |
| 6,153,993 A | * | 11/2000 | Oomura et al. ............... 318/434 |
| 6,213,734 B1 | * | 4/2001 | Imhof et al. ................... 417/356 |
| 6,362,581 B1 | * | 3/2002 | Matsushiro et al. ...... 318/400.11 |

(Continued)

FOREIGN PATENT DOCUMENTS

| WO | WO 01/47091 A1 | 6/2001 |
| WO | WO 2005/011078 A1 | 2/2005 |

OTHER PUBLICATIONS

British Search Report dated Jul. 30, 2010 in corresponding British Application No. 1005178.7.

*Primary Examiner* — Pedro J Cuevas
(74) *Attorney, Agent, or Firm* — Oliff PLC

(57) ABSTRACT

An electrical machine system including a permanent magnet assembly having a magnetic field and a plurality of conductive coils, the magnet assembly and coils arranged for relative rotation between the coils and magnetic field in the manner of an electrical generator or motor, the system further comprising a current injector electrically connected to said coils and arranged selectively to supply a current signal thereto, the current signal being asynchronous with the frequency of rotation between the permanent magnet assembly and coils so as to heat and thereby demagnetise one or more magnet within said permanent magnet assembly.

16 Claims, 3 Drawing Sheets

(56) References Cited

U.S. PATENT DOCUMENTS

| | | |
|---|---|---|
| 7,969,057 B2 * | 6/2011 | Kusase et al. .................. 310/181 |
| 8,193,671 B2 * | 6/2012 | Okamoto .................. 310/154.06 |
| 2002/0021098 A1 * | 2/2002 | Matsushiro et al. .......... 318/254 |
| 2006/0049809 A1 * | 3/2006 | Sasaki ............................. 322/89 |
| 2008/0197816 A1 * | 8/2008 | Monier et al. .................. 322/89 |
| 2008/0278015 A1 * | 11/2008 | Reisinger ...................... 310/152 |
| 2009/0091198 A1 * | 4/2009 | Husband et al. ................ 310/46 |
| 2010/0026231 A1 * | 2/2010 | Komatsu et al. ............... 318/722 |
| 2011/0273046 A1 * | 11/2011 | Okamoto .................. 310/154.45 |

* cited by examiner

ELECTRICAL MACHINE SAFETY SYSTEM

The present invention relates to electrical machines and more particularly to permanent magnet electrical machines for which there is desired to be some form of fail-safe or fault-tolerant capability.

Permanent magnet electrical machines are often favoured for use in applications in which high power density is required for motor or generator applications. Common applications for such machines include land vehicles, aircraft, water-borne vessels and fixed industrial applications.

A conventional permanent magnet electrical machine has an array of permanent magnets and a further array of magnetic coils (often called windings), usually disposed within slots in an armature of high permeability material, such as laminated iron. The magnetic coils commonly form a ring-shaped array on a stator around a rotor which carries the permanent magnets. Turning the rotor relative to the stator creates currents in the coils, allowing the electrical machine to be used as a generator. Conversely, alternating current can be applied to the coils to cause the rotor to turn, allowing the electrical machine to be used as a motor.

In order to ensure safe operation of a permanent magnet electrical machine, there is a need to protect against faults. Whilst permanent magnet machines have many advantages over competing machine technologies, such as higher efficiency, torque density and controllability, one significant drawback which has hindered the adoption of permanent magnet machines in a number of applications is the inability to effectively inhibit or remove the excitation. Such a feature is often required in order to prevent faults within the electrical machine adversely affecting itself and/or other related equipment. Of particular concern is the risk of overheating and the consequential damage in the region of the shorted turn(s).

Whilst there are numerous applications for electrical machines for which it would be possible simply to halt relative rotation between the rotor and stator, there exist a number of application in which such a solution is not available. For example, within a gas turbine engine in aerospace applications, an electrical machine may be coupled to a gas turbine engine shaft, the rotation of which cannot be prevented without serious safety implications.

One potential method of overcoming this problem relates to a configuration in which there is a relatively large number of turns per phase (e.g. as typically occurs in random-wound or mush windings). In such instances the faulted phase can be shorted-circuited at the terminals of that phase. For single-fault turns within a given coil, this method relies on the fact that each turn in the winding has approximately the same impedance as every other turn. Hence, when the phase is shorted at its terminals, approximately the same current flows in each turn (including the faulted-turn(s)). In the case of a fault-tolerant machine the current flowing in each turn in such circumstances will be approximately rated current and thus the risk of damage by over-heating is mitigated.

A second methodology is described in International Patent Application PCT/GB2004/002601 (Publication No. WO 2005/011078), wherein it is proposed to inject a nullifying current into the unfaulted turns of the faulted phase. The magnitude and phase of the injected current should be such that the net flux (i.e. that from the permanent magnets plus that from the current in the stator winding) linking the faulted turn(s) is close to zero. In such circumstances current flowing in the shorted turns will be close to zero and so the risk of overheating should be minimal. The current in the unfaulted turns of the faulted phase should also not be significantly greater than rated current, thus mitigating against the risk of overheating within those turns.

However if the turns are of unequal impedance and the converter does not inject the correct nullifying current, then the risk of overheating and consequent propagation of damage to the wider electrical system or indeed other parts of the engine is not removed. Accordingly the above-described attempts at a solution do not provide a fully comprehensive safeguard.

It is an aim of the present invention to provide an electrical machine and a method of operation thereof which provides for a fail-safe operation in a manner which mitigates the problems described above.

An electrical machine system comprising a permanent magnet assembly having a magnetic field and a plurality of conductive coils, the magnet assembly and coils arranged for relative rotation between the coils and magnetic field in the manner of an electrical generator or motor, the system further comprising a current injector electrically connected to said coils and arranged selectively to supply a current signal thereto, the current signal being asynchronous with the frequency of rotation between the permanent magnet assembly and coils so as to heat and thereby demagnetise one or more magnet within said permanent magnet assembly.

In one embodiment, the permanent magnets have a normal operating magnetism and the current injector is arranged to supply a current signal having frequency characteristics and for a duration sufficient to demagnetise the permanent magnet by at least 80%, typically 90% or more, of its normal operational magnetism. The current signal may irreversibly demagnetise the permanent magnet to such an extent.

The current injector may be arranged to supply a current signal for a duration sufficient to raise the temperature of one or more magnets within the permanent magnet assembly to above or equal to Curie temperature. The temperature rise may be achieved by induced currents within the permanent magnets.

The duration of application of the current signal may be between 1 and 90 seconds, more particularly between 10 and 90 seconds and preferably between 10 and 60 seconds. The permanent magnet(s) may be suitably demagnetised within this timeframe.

In one embodiment, a plurality of sensors is provided for detecting one or more operational variables of the system in use. A controller may be arranged to receive sensor readings and to control application of the current signal by the injector in dependence upon the received readings.

The controller may control application of the current signal by the injector in a transient manner based upon readings of said operational variable from said sensor. Alternatively the controller may initiate a predetermined control sequence in response to detection of an operational variable value indicative of a fault by said sensor.

In one embodiment, the voltage induced in the stator windings by the permanent magnet rotation is detected or measured. This may be used to determine the state of magnetisation of the permanent magnet. In one embodiment, the sensor senses the temperature of one or more magnets within the magnet assembly. The controller may be arranged to cease supply of current to the coils by the injector once the sensed potential and/or temperature meets or exceeds a predetermined value, which may be indicative of the desired demagnetisation of the permanent magnets.

The permanent magnet assembly may be spaced from the conductive coils by an air gap and the current injector may be arranged to supply a current signal to said coils which generates a harmonic-rich electromagnetic field within the air gap.

The electromagnetic field may be asynchronous and/or contra-rotating with respect to the relative rotation between the magnet assembly and coils.

The supplied current signal may have a waveform which varies in a cyclic manner relative to the frequency of rotation between permanent magnet assembly and the coils. The supplied current signal may also vary in magnitude over a further time domain relative to duration for which the current signal is supplied to the coils. Thus the signal may sweep a frequency range over the demagnetisation process.

In one embodiment the coils comprise a plurality of groups, each group being associated with an electrical phase of the system, the system further comprising a plurality of injectors, each injector being electrically connected to a respective group of coils for supply of said current signal thereto.

In one embodiment, the system comprises a rotor and stator assembly. The rotor may comprise the permanent magnet assembly and the stator may comprise the plurality of conductive coils. The coils of the stator may be arranged in a ring-shaped array with the rotor being mounted within said ring.

According to a further aspect of the present invention, there is provided a corresponding method of operating an electrical machine.

One or more working embodiments of the present invention are described in further detail below by way of example with reference to the accompanying drawings, of which:

Unlike the existing methods, the present invention provides for an electrical machine that is fail-safe in that the permanent magnets can be demagnetised so as to leave the rotor in a magnetically inert state such that significant voltages or currents can no longer be induced in the windings by relative rotation between the rotor and stator.

The present invention makes use of the material properties of the permanent magnet(s) which allow for degradation of the magnetic properties with elevated temperature.

Figure 1:
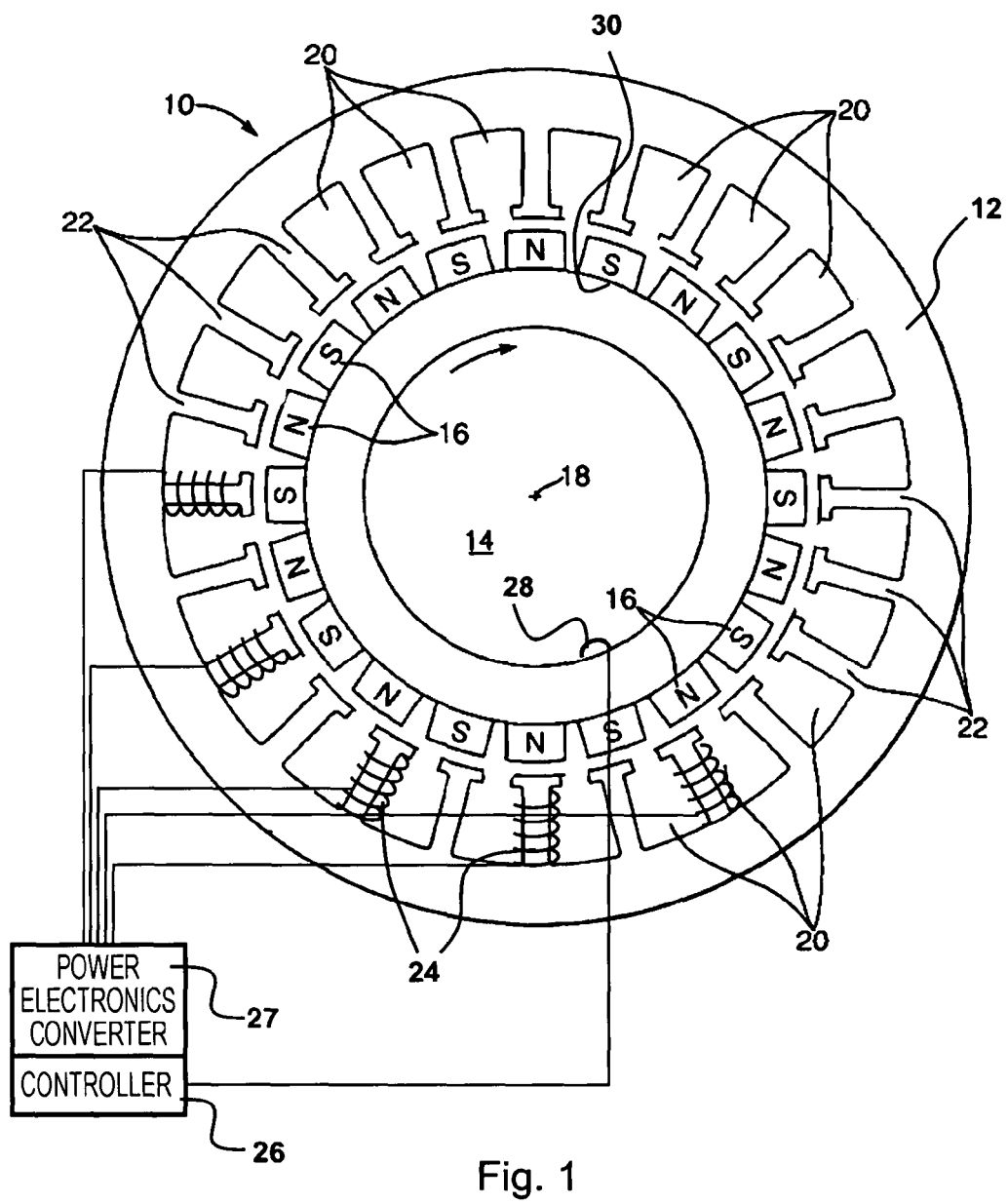
FIG. 1 is a cross-section through a multiphase permanent magnet electrical machine system according to one embodiment of the present invention.

FIG. 1 shows a cross-section through a permanent magnet electrical machine 10 which has a stator 12 arranged circumferentially around a rotor 14. The rotor 14 carries an array of permanent magnets 16 magnetised in a generally radial direction and alternating in polarity, so that the rotor 14 provides an alternating array of north and south magnetic poles, indicated in FIG. 1 by the letters N and S. In this example, the array is circular so as to provide a ring of permanent magnets of alternating ploarity.

In this example, a total of twenty poles are provided around the rotor 14. The rotor is mounted by means of appropriate bearings to turn about the axis 18. The stator 12 (or armature) has a ring of slots 20 formed therein, separated by teeth 22.

Each pair of adjacent slots 20 accommodates a winding in the form of a coil 24. Each coil 24 is located around the tooth 22 which separates the slots 20. The next pair of slots 20 accommodates another coil, and so on around the stator 12. Thus, there are coils around alternate teeth around the armature. Accordingly, a stator having twenty four slots, as shown in FIG. 1, will accommodate twelve coils. These can be divided into three groups of four coils to provide three electrical phases.

In this geometry, the coil axis is disposed along the tooth 22, radially from the axis 18 of the machine 10.

The individual coils 24 are connected to an electrical control means, which in this embodiment takes the form of a power electronics converter 27, which is an example of a current injector. Whilst only a single power electronics converter is shown in FIG. 1, it will be appreciated that in a practical embodiment, three such devices would typically be provided, each being dedicated to a phase of the electrical machine and thus being connected to only a subset of the total windings 24 which relate to that phase.

It is to be noted that any form of supervisory controller which is capable of the processing steps described below may be used which may or may not operate in conjunction with a power electronics converter. Accordingly the controller typically comprises one or more processors which, for the purpose of the present invention, may be defined in terms of the function they perform rather than the exact physical make-up or location thereof.

A sensor is shown schematically at 28 which is in communication either directly or indirectly (via a network and/or other electrical equipment) to the controller 26. One or more sensors 28 may be mounted at any appropriate location(s) in order to measure one or more operational variables for the electrical machine 10. Such sensing means may be used to determine, for example, any or any combination of: rotational speed or frequency of the rotor; frequency, phase or harmonic content of the voltage and/or current in coils 24; temperature at one or more locations of the rotor; torque supplied to or from the electrical machine; and/or vibration or other unwanted motion of the rotor or components attached thereto.

Additional or alternative sensing means may be provided to determine the electromotive force (EMF) in one or more coils 24. Such sensing means may be implemented by way of the controller 26 or else using conventional voltage sensing or determination equipment.

FIG. 1 shows an electrical machine topology in which the stator 12 and the associated coils 24 are stationary and located outside the permanent magnets of the radial flux internal rotating rotor 14. However, the technique applies equally to other topologies such as inside-out and axial flux machines. Accordingly, the principles which will now be described in relation to the embodiment of FIG. 1 can be applied also to machines with varying numbers of permanent magnets (or phases thereof), magnetic poles and/or coils; and/or machines in which the permanent magnet system is located radially outside the magnetic coils, and/or to machines in which the magnetic coils rotate past fixed permanent magnets.

In certain practical applications, a machine of the type illustrated in FIG. 1 may be operated at a rotational speed of up to or exceeding 6000 rpm, giving rise to an output frequency in excess of 1000 Hz. Such applications may be suited to use for example as a starter/generator within a gas turbine engine.

A significant problem with this type of machine is that the permanent magnets 16 can continue to rotate once the short-circuit or other fault has occurred and thus potentially large currents are induced in the faulted turns of the stator windings 24. In such cases, the present invention aims to remove the source of excitation which drives this potentially hazardous fault current by demagnetising the permanent magnets irreversibly or only partially reversibly to such an extent that any currents induced anywhere in the stator windings of the machine are of relatively small magnitude. Such a magnitude would be at least less than rated current for the machine and thus create no risk of over heating.

Figure 2:
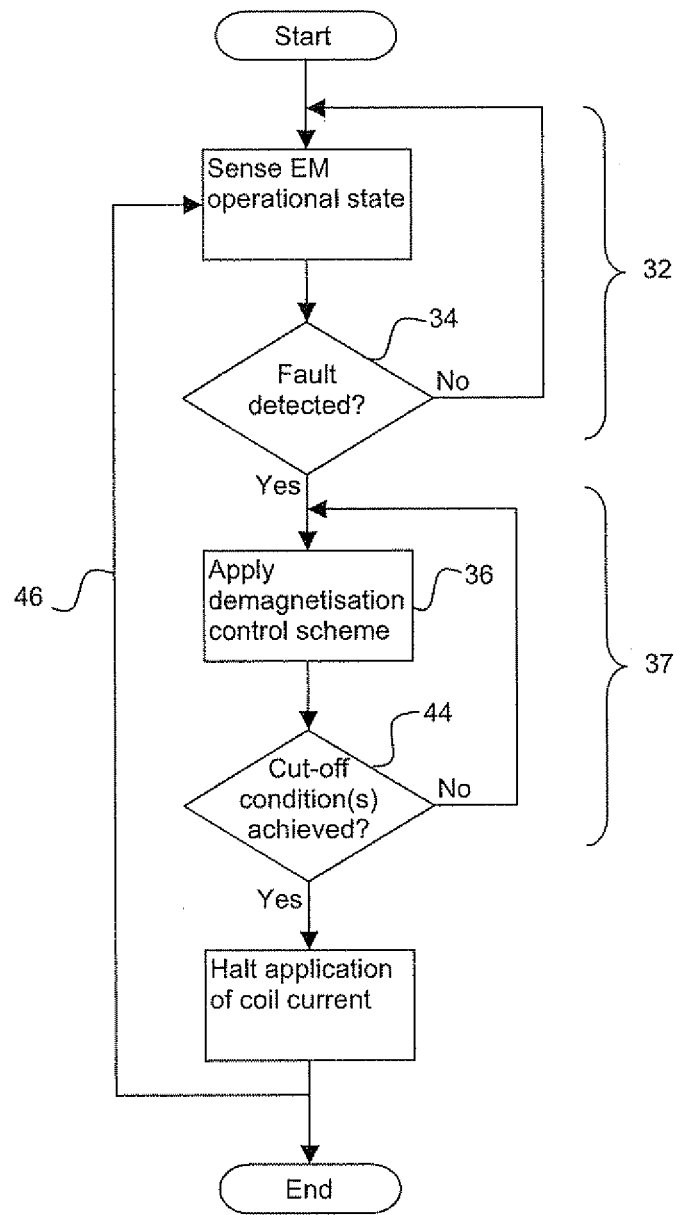
FIG. 2 shows the basic process steps in implementing a control methodology according to the present invention.

Turning now to FIG. 2, a basic process for operation of a failsafe according to one embodiment of the present invention is shown. During normal operation of the electrical machine, a basic feedback loop 32 is operated, by which sensor readings of operational variables are monitored by controller 26. The controller compares the sensor readings at 34 to one or more predetermined criteria indicative of a fault, such as a short-circuit within windings 24. At this stage the controller may conduct some processing of the sensor-derived data for fault diagnosis or prognosis purposes. Accordingly the controller can determine a severity or type of detected fault.

In the event that a fault is determined of a severity or type for which it is necessary to initiate a failsafe procedure, the controller proceeds to apply a demagnetisation control scheme at 36 to demagnetise the rotor permanent magnets as will be described below.

Figure 3:
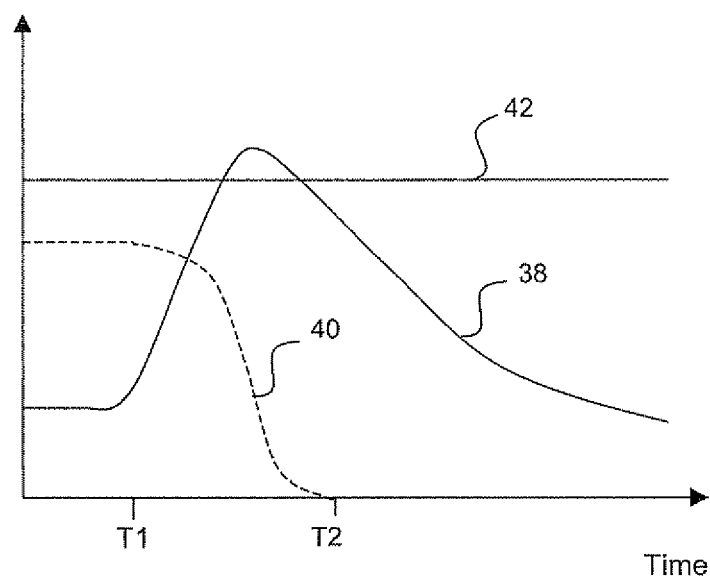
FIG. 3 shows plots of magnetic field strength and temperature against time.

FIG. 3 shows schematic plots of temperature 38 and magnetic strength (moment) 40 for permanent magnets 16 within the machine. During normal operation, temperature and magnetic strength are substantially constant, indicative of substantially steady state operation up to time $T_1$. At $T_1$ the controller instigates the demagnetisation failsafe scheme according to step 36 of FIG. 2.

The inventor has determined that thermal demagnetisation can be achieved in practice by deliberately, and dramatically, increasing the loss generated in the magnets themselves as a result of induced eddy currents. This can be achieved by using the phases of the power electronics converter 27 to drive stator phase currents, the magnetic field of which induces eddy-currents (primarily in the permanent magnets) which heat the permanent magnets of the rotor such that their working line/stored energy product reduces with increasing temperature.

This may be achieved by the controller applying a predetermined current signal dependent on the rotational speed or frequency of the machine rotor. Additionally or alternatively, the controller may enter a feedback loop 37 in which sensor readings are used to determine the appropriate stator phase currents to be applied. For example, the temperature of the magnets may be monitored and the stator currents may be driven to achieve a desired temperature rise for a predetermined time duration. Additionally or alternatively, the residual EMF induced in the stator windings may be monitored and stator currents driven accordingly. Additionally or alternatively, the rotational speed or frequency of the rotor may be monitored and the current signal frequency altered accordingly.

In the embodiment, which is in many ways preferred to temperature sensing, in which the residual EMF in one or more stator coils is detected, the state of magnetisation of the permanent magnet rotor may be determined there-from. This could be achieved using observing means whilst the injection current is applied/flowing or else by initiating a, typically brief, pause in the injected current in order to measure the EMF induced in the coils directly. Such techniques may be beneficially practicable for the arrangement of FIG. 1, since complex electrical connections with the rotor may be avoided for the purpose of assessing demagnetisation.

An algorithm can be used to determine magnetic strength of the permanent magnets based on the determination of the voltage induced in the coils. Such an algorithm may be generated theoretically or empirically. For example, in a simple embodiment, the determination that the permanent magnets are suitably demagnetised may require the induced voltage to drop below a predetermined threshold value.

The effect of the driven current in the coils 24 is shown by the temperature increase after time $T_1$.

In one example, the faulted phase of a short-circuited winding may at least in part be used to drive the stator phase currents.

The aim of the control sequence is to thermally demagnetise the permanent magnets by raising the temperature well above a normal operating range but safely below a temperature which would cause catastrophic loss of mechanical integrity of the magnets or associated rotor or stator components. Ultimately, all magnetic materials lose their entire magnetic properties at their so-called Curie Temperature. The Curie temperature for the permanent magnets of this embodiment is shown at 42 in FIG. 3. Transiently taking a material above its Curie Temperature and then allowing the material to cool down results in no residual permanent magnetic properties.

Ideally the controller controls the elevation of the magnet temperature to or slightly above the Curie Temperature of the magnetic material throughout the entire magnet body. However, significant, if not total, demagnetisation can typically be achieved by taking the magnet beyond its manufacturer's specified operation range by some 50-100° C. Accordingly it may not be necessary to meet or exceed the Curie temperature throughout the entirety of the permanent magnet material for effective demagnetisation to occur. For example, a shorted phase of a permanent magnet machine may experience currents which are multiple times the rated current if left unchecked, which for a gas turbine engine starter/generator could achieve several thousand amps. Thus to safely ensure that the rated current is not exceeded, it is required that the permanent magnets are degraded by at least 90% of their normal magnetisation.

A basic tenet of permanent magnet machine design is to minimise the rotor loss by removing harmonics from the airgap field etc. Hence, in un-faulted operation, every effort is generally made to produce a field which is essentially stationary with respect to the rotor itself, thus minimising losses in the rotor magnet. In some cases, such as modular machines, there are inevitable harmonic components in the field, but their impact on rotor loss is managed such that the rotor does not experience significant temperature rise.

However according to embodiments of the present invention, following a fault in which the decision is taken by the supervisory controller to demagnetise the rotor, the frequency, phase and harmonic content of the stator current can be modified dramatically to produce a grossly asynchronous (possibly contra-rotating) and harmonic rich airgap field (recalling that the rotor is driven by the prime mover at engine shaft speed in the case of a gas-turbine).

A typical increase in losses of between 1 and 2 orders of magnitude could be achieved by applying a current waveform which grossly exacerbates rotor loss. The inventor has advantageously determined that the magnitude of these stator currents need not be greater than those used in full load steady-state operation. Accordingly injected currents can be at or below rated current for the power electronic converter. Instead the phase rotation, frequency and/or harmonic content can be controlled to give rise to the losses required for heating the permanent magnet assembly. In this way the power electronics converter can be rated for steady state operation and will not require up-rating for this demagnetisation scheme.

In one embodiment, it is proposed to time-vary the frequency of the applied coil current seen by the permanent magnets (i.e. relative to the rotational frequency of the rotor) so as to induce eddy currents at different depths within the magnets 16. Higher frequencies tend to induce currents close to the rotor/magnet surface, whilst lower frequencies tend to penetrate to greater depths. Thus in addition to variations in current associated with the AC waveform applied, it is proposed to generate larger scale frequency variations over a greater timescale (typically one or more seconds) in order to 'sweep' a frequency range. Even if such a technique is not used, the natural thermal conductivity of the magnet material will allow heat generated closer to the magnet surface to raise the temperature throughout the depth of the magnet over time.

In order to reduce the power/current drawn from the supply to which the electrical machine is connected, one or more of the phases of the machine can, initially, be used to supply the necessary current to the other phase(s). This technique is intended to be used during the initial period of demagnetisation while the permanent magnets retain a significant part of their original permanent magnetism.

Current is injected into the stator phase(s) such that the working point of the permanent magnets is moved down below the "knee" of its demagnetisation characteristic so that when the permanent magnets "recoil" they are working at reduced flux density and therefore induce a reduced voltage in the stator windings. Such current injection should be undertaken at the start of or during the eddy-current demagnetisation process in order to hasten the demagnetising process.

At 44 in FIG. 2 the controller determines that sufficient demagnetisation throughout the permanent magnets has been achieved, for example, by temperature or EMF measurement as described above. This is indicated as time $T_2$ in FIG. 3. The temperature rise may be determined by locating temperature sensor(s) at a distance removed from the surface of one or more of the permanent magnets so as to measure the temperature within the body of the magnet.

The safe timeframe for achieving the desired demagnetisation is between single numbers of seconds and tens of seconds, preferably between 1 and 30 seconds and typically in a range of 5 to 20 seconds.

Once demagnetisation has been achieved, the stator current will no longer be needed and the converter can be turned off. The once 'permanently' magnetised rotor has thus become a magnetically inert rotating mass which can no longer induce hazardous currents in the stator windings. At this point the control scheme may terminate. However it is envisaged as a safeguard that ongoing sensing of the operational state of the electrical machine is undertaken as indicated by arrow 46 in FIG. 2.

The new scheme is independent of, but complementary to, the existing methods used for avoiding over-currents in the stator winding. The new scheme can therefore be used with or instead of the existing methods. In particular, it is envisaged that the present invention will allow for a failsafe capability that is invoked in the event of a hazardous or uncontrolled mode of operation. In further embodiments of the invention, the steady-state design of the electrical machine could be adjusted to take advantage of the ideas of this invention. For example, lower temperature grade magnets could be considered as these will require less heating to demagnetise them (e.g. replace SmCo by NdFeB). Similarly the permanent magnets may be less subdivided so that induced eddy-currents and resultant heating are larger in the steady-state resulting in higher operating temperature (i.e. closer to their Curie point).

Also the thermal resistance between the permanent magnets and the rotor body might be increased so that (a) in the steady-state they run hotter than conventional configuration and (b) they are thus easier to heat towards their Curie temperature when required. Accordingly an insulating material or thermal barrier material may be provided at 30 at the interface between the magnets 16 and the rotor body 14 to which they are mounted.

The eddy-currents do not have to be induced solely in the permanent magnets. Any adjacent seat of eddy-currents will help e.g. in the metal banding that is used to retain the permanent magnets (of a surface-mounted design) in close contact with the rotor body at all times.

Additionally or alternatively, the demagnetising currents in the various phases could be coordinated in such a way as to achieve additional goals e.g. electromagnetic torque ripple minimisation.

The hardware and control scheme described above may also be used as a failsafe for faults other than short circuits within the machine windings, such as, for example, in a situation in which one or more of the power electronic converter phases has been lost and the control system operating on the unfaulted phases cannot compensate for the faulted phase. The present invention may be used to accommodate any such instances in which the consequences of a fault are considered critical to safety or the integrity of a larger system.

The method could be adapted to non-fault-tolerant permanent magnet electrical machines where it is required to give them some degree of fail-safe or fault-tolerant capability.

Whilst the invention has been described in relation to a permanent magnet machine in an aero gas-turbine, the concept is of wider applicability and it can be used wherever it is desired to demagnetise the machine's permanent magnets for reasons discussed above.

The invention claimed is:

1. An electrical machine system comprising a permanent magnet assembly having a magnetic field and a plurality of conductive coils, the magnet assembly and coils arranged for relative rotation between the coils and magnetic field in the manner of an electrical generator or motor, the system further comprising a current injector electrically connected to said coils and arranged selectively to supply a current signal thereto, the current signal being asynchronous with the frequency of rotation between the permanent magnet assembly and coils so as to heat and thereby demagnetise one or more magnet within said permanent magnet assembly.

2. An electrical machine system according to claim 1, wherein the permanent magnets have a normal operating magnetism and the current injector is arranged to supply a current signal having frequency characteristics and for a duration sufficient to demagnetise the permanent magnets by 90% or more of their normal operational magnetism.

3. An electrical machine system according to claim 1 wherein the current injector is arranged to supply a current signal having frequency characteristics and for a duration sufficient to raise the temperature of one or more magnets within the permanent magnet assembly to above its Curie temperature.

4. An electrical machine system according to claim 1, further comprising a sensor for detecting an operational variable of the system in use and a controller arranged in response to detection of said operational variable by said sensor to control application of the current signal by the injector.

5. An electrical machine system according to claim 4, wherein the operational variable comprises any or any combination of: relative rotational speed or frequency between the magnet assembly and coils; frequency, phase or harmonic content of voltage or current in the coils; and/or temperature at one or more locations in the system.

6. An electrical machine system according to claim 4, wherein the controller controls application of the current signal by the injector in a transient manner based upon readings of said operational variable from said sensor.

7. An electrical machine system according to claim 4, wherein the controller initiates a predetermined control sequence in response to detection of an operational variable value indicative of a fault by said sensor.

8. An electrical machine system according to claim 4, wherein the sensor senses temperature or voltage of one or more magnets within the magnet assembly and the controller is arranged to cease supply of current to the coils by the injector once the sensed temperature or voltage meets or exceeds a predetermined value.

9. An electrical machine system according to claim 1, wherein the permanent magnet assembly is spaced from the conductive coils by an air gap and the current injector is arranged to supply a current signal to said coils which generates a harmonic-rich electromagnetic field within the airgap which is asynchronous and/or contra-rotating with respect to the relative rotation between the magnet assembly and coils.

10. An electrical machine system according to claim 1, wherein the magnitude of the current supplied by the injector is less than or equal to a current value for which the system is rated for normal operation.

11. An electrical machine system according to claim 1, wherein the supplied current signal has a waveform which varies in a cyclic manner relative to the frequency of rotation between permanent magnet assembly and the coils.

12. An electrical machine system according to claim 11, wherein the supplied current signal also varies in magnitude over a further time domain relative to duration for which the current signal is supplied to the coils.

13. An electrical machine system according to claim 1, wherein the coils comprise a plurality of groups, each group being associated with an electrical phase of the system, the system further comprising a plurality of injectors, each injector being electrically connected to a respective group of coils for supply of said current signal thereto.

14. An electrical machine system according to claim 1, wherein the injector comprises a power electronics convertor.

15. A method of operating an electrical machine comprising a permanent magnet assembly having a magnetic field and a plurality of conductive coils, the magnet assembly and coils arranged for relative rotation between coils and magnetic field in the manner of an electrical generator or motor, the method comprising:
    sensing operational variables of said electrical machine;
    upon determining occurrence of a fault within the machine, controlling operation of a current injector to automatically supply a current signal to said coils, said current signal being asynchronous with the frequency of rotation between the permanent magnet assembly and coils so as to heat and thereby demagnetise one or more magnet within said permanent magnet assembly.

16. A method according to claim 15, further comprising:
    sensing the temperature at a location within the permanent magnet assembly; and,
    ceasing supply of said current signal upon determination that said temperature has met or exceeded a Curie temperature for the magnetic material of the permanent magnet assembly.

* * * * *